(12) United States Patent
Stein et al.

(10) Patent No.: US 11,364,811 B1
(45) Date of Patent: Jun. 21, 2022

(54) POWERING ELECTRIC VEHICLE ACCESSORY DEVICES FROM BACK EMF GENERATED BY AN ELECTRIC MOTOR

(71) Applicant: Motiv Power Systems, Inc., Foster City, CA (US)

(72) Inventors: Elias Stein, San Francisco, CA (US); Tai-Sik Hwang, Foster City, CA (US); Justin Tomlin, San Francisco, CA (US); James Michael Castelaz, Alameda, CA (US)

(73) Assignee: Motiv Power Systems, Inc., Foster City, GA (US)

( * ) Notice: Subject to any disclaimer, the term of this patent is extended or adjusted under 35 U.S.C. 154(b) by 0 days.

(21) Appl. No.: 16/191,444

(22) Filed: Nov. 15, 2018

Related U.S. Application Data

(60) Provisional application No. 62/586,828, filed on Nov. 15, 2017.

(51) Int. Cl.
| | |
|---|---|
| *H02P 27/08* | (2006.01) |
| *B60L 58/10* | (2019.01) |
| *B60L 1/00* | (2006.01) |
| *H02M 7/5387* | (2007.01) |
| *H02M 3/158* | (2006.01) |

(52) U.S. Cl.
CPC .................. *B60L 58/10* (2019.02); *B60L 1/00* (2013.01); *H02P 27/08* (2013.01); *H02M 3/1582* (2013.01); *H02M 7/53871* (2013.01)

(58) Field of Classification Search
CPC ....... H02M 3/155; H02M 7/5387; H02P 7/18; B60L 3/04; B60L 7/003; B60L 7/08; B60L 7/06
See application file for complete search history.

(56) References Cited

U.S. PATENT DOCUMENTS

| 5,780,980 | A  * | 7/1998  | Naito ..................... B60L 58/40 318/139 |
| 7,176,646 | B2 * | 2/2007  | Iwazawa ................ B62D 5/046 318/432 |
| 7,845,459 | B2 * | 12/2010 | Kasai ..................... B62D 5/046 180/443 |
| 8,280,589 | B2 * | 10/2012 | Iwasaki ................. B62D 5/046 701/41 |
| 8,281,886 | B2 * | 10/2012 | Saha ..................... B60L 15/025 180/65.285 |

(Continued)

*Primary Examiner* — Rina I Duda
(74) *Attorney, Agent, or Firm* — Adibi IP Group, PC; Amir V. Adibi; Andrew C. Palmer

(57) ABSTRACT

A controller generates a target motor torque and target accessory power information during operation of an electric vehicle. The target motor torque and target accessory power information maintain a DC-link of the electric vehicle powertrain within a safe DC-link operating range. The DC-link has a DC-link voltage that is used to supply an accessory device and a motor. The accessory device is disposed on the electric vehicle and includes vehicle indictors, hydraulics, or any other accessory involved in the operation of the vehicle. The motor drives the vehicle. The controller receives the DC-link voltage, motor speed, desired output torque information, desired accessory power information, and the safe DC-link operating range and generates therefrom the target motor torque and the target accessory power information.

20 Claims, 9 Drawing Sheets

(56) References Cited

U.S. PATENT DOCUMENTS

| | | | | |
|---|---|---|---|---|
| 8,319,458 | B2 * | 11/2012 | Hiti | B60L 3/0061 |
| | | | | 318/375 |
| 8,446,113 | B2 * | 5/2013 | Welchko | B60L 3/04 |
| | | | | 318/376 |
| 9,399,407 | B2 * | 7/2016 | Zhou | B60L 15/06 |
| 2014/0183941 | A1 * | 7/2014 | Bae | B60L 50/16 |
| | | | | 307/10.1 |
| 2014/0340095 | A1 * | 11/2014 | Schneider | B60L 3/003 |
| | | | | 324/511 |
| 2016/0211773 | A1 * | 7/2016 | Degner | H02M 1/38 |
| 2016/0229393 | A1 * | 8/2016 | McCullough | B60W 20/30 |
| 2016/0368472 | A1 * | 12/2016 | Takada | H02M 3/155 |

\* cited by examiner

WAVEFORM DIAGRAMS UNDER CONVENTIONAL CONTROL

ANOTHER EMBODIMENT

POWERING ELECTRIC VEHICLE ACCESSORY DEVICES FROM BACK EMF GENERATED BY AN ELECTRIC MOTOR

CROSS REFERENCE TO RELATED APPLICATIONS

This application claims the benefit under 35 U.S.C. § 119 from U.S. Provisional Patent Application Ser. No. 62/586,828, entitled "Powering Electric Vehicle Accessory Devices From Back EMF Generated By An Electric Motor," filed on Nov. 15, 2017, the subject matter of which is incorporated herein by reference.

TECHNICAL FIELD

The present disclosure relates generally to electric vehicle power systems, and more particularly to techniques for powering accessory devices in electric vehicles.

BACKGROUND INFORMATION

A typical electric vehicle includes a voltage source such as a battery pack, an accessory device (for example, vehicle indictors or hydraulics), and an electric motor. During operation of the electric vehicle, the battery pack supplies the accessory device and the electric motor. In some cases, the battery pack may become disconnected and no longer supplies the motor. This causes the vehicle to slow down and eventually halt. After the battery pack is disabled but while the vehicle is still in motion, the accessory device may no longer be operable. A solution that overcomes these challenges is desired.

SUMMARY

A system includes an accessory device, an inverter, an electric motor, a voltage source, and a DC power bus. The system is part of an electric vehicle. In one embodiment, the accessory device is a hydraulic system that controls power steering, the voltage source is a battery pack, and the motor is a three phase synchronous permanent magnet electric motor. The accessory device is powered by and receives a DC supply voltage from the DC power bus. The battery pack regulates and maintains the DC supply voltage on the DC power bus.

During operation of the electric vehicle, the electric motor generates a counter-electromotive force or a back electromotive force ("back EMF"). If the battery pack becomes disconnected during operation, for example due to fuse tripping due to an overvoltage condition, then a novel active control technique is used to control the motor and inverter such that the DC supply voltage from the DC power bus is maintained substantially above a minimum voltage. The minimum voltage is maintained by using the back EMF generated by the motor. The minimum voltage is maintained as long as the vehicle is moving above a minimum velocity. After the vehicle falls below the minimum velocity, the motor no longer generates sufficient back EMF to supply the DC supply voltage on the DC power bus and the accessory device becomes disabled.

In one embodiment, a controller includes a torque controller, a voltage controller, a field weakening controller, and a control blending circuit. The controller generates a target motor torque and target accessory power information during operation of an electric vehicle. The target motor torque and target accessory power information maintain a DC-link of the electric vehicle powertrain within a safe DC-link operating range. The DC-link has a DC-link voltage that is used to supply an accessory device and a motor. The controller receives the DC-link voltage, motor speed, desired output torque information, desired accessory power information, and the safe DC-link operating range and generates therefrom the target motor torque and the target accessory power information.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
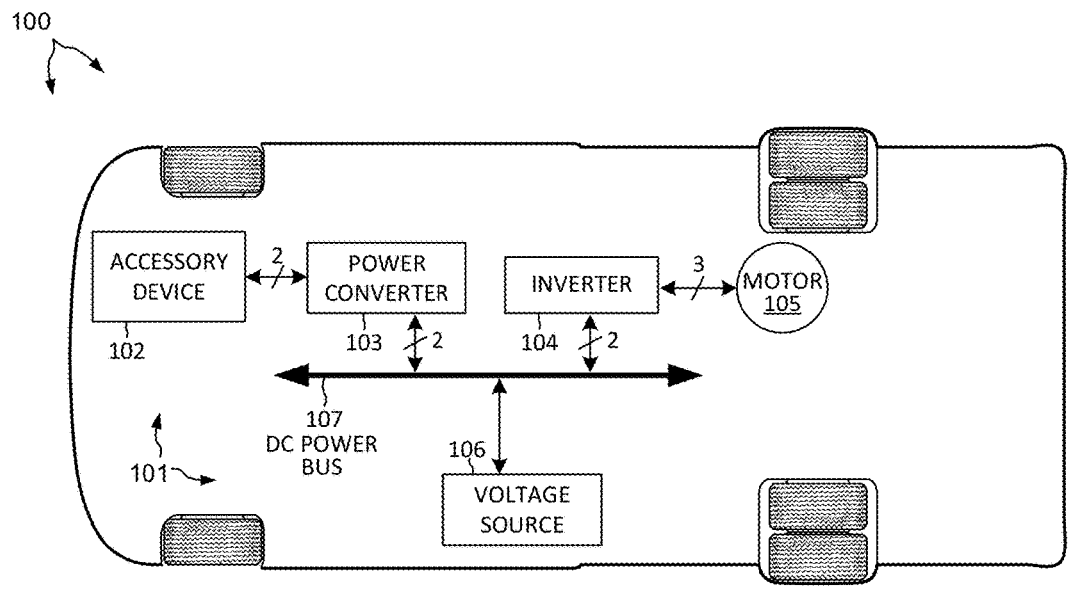
FIG. 1 is a high-level diagram of a system 101 of an electric vehicle 100.

FIG. 1 is a high-level diagram of a system 101 of an electric vehicle 100. In one example, the electric vehicle 100 is an electric shuttle bus that utilizes an entirely electric powertrain. The system 101 includes an accessory device 102, a power converter 103, an inverter 104, an electric motor 105, a voltage source 106, and a DC power bus 107. The voltage source 106 stores electrical energy utilized by the power train for operating electric vehicle 100. In this example, voltage source 106 is an electrochemical battery pack that stores a maximum of forty kilowatt hours. (The term "battery pack" is used to refer to an electrochemical battery pack.) The accessory device 102 receives a DC supply voltage and performs an auxiliary function involved in electric vehicle operation. In one example, the accessory device 102 is a hydraulic system, an electric vehicle indicator system, or a heating and cooling system. In this example, the motor 105 is a three phase synchronous permanent magnet electric motor.

During operation, the battery pack 106 generates and supplies a DC voltage onto the DC power bus 107. The battery pack effectively regulates the voltage on the DC power bus. The inverter 104 converts the DC voltage on the DC power bus 107 into an AC voltage that is used to drive the electric motor 105. The power converter 103 supplies the accessory device 102 from the DC power bus 107. In this example, power converter 103 is a bi-directional DC-to-DC buck boost power converter. In other examples, power converter 103 is a unidirectional power converter that operates in a DC step up mode, DC step down mode or DC-to-AC power conversion mode depending on the DC power bus 107 voltage and on the input voltage of the accessory device 102.

Figure 2:
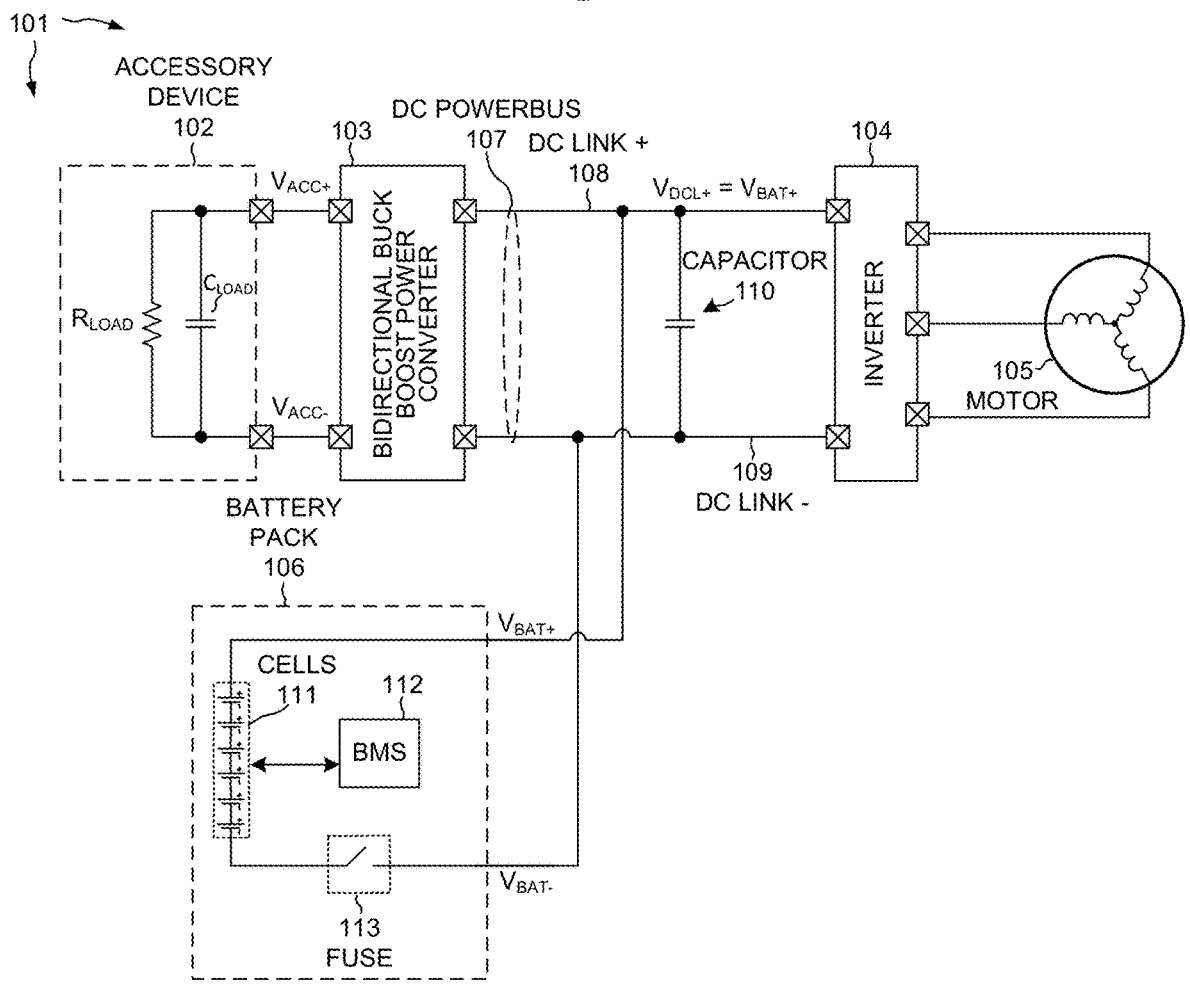
FIG. 2 is a more detailed diagram of the system 101 of the electric vehicle 100.

FIG. 2 is a more detailed diagram of the system 101 of the electric vehicle 100. The DC power bus 107 includes a positive supply voltage conductor ("DC LINK +") 108 and a negative supply voltage conductor ("DC LINK −") 109. A capacitor 110 is coupled between DC LINK + 108 and DC LINK − 109. The capacitor 110 operates to smooth the voltage signals on the DC power bus 110. The DC LINK + 108 is set to positive battery supply voltage $V_{BAT+}$ and the DC LINK − 109 is set to negative battery supply voltage $V_{BAT-}$.

The battery pack 106 comprises a plurality of electrochemical storage cells (referred to as "cells") 111, a Battery Management System (BMS) 112, and a fuse 113. In this example, cells 111 are of a lithium-ion chemistry type. Although each of the cells depicted in FIG. 2 include cells connected in series, in actuality the cells may be connected in series, in parallel, or in combination of both series and parallel. Various types of battery chemistries and cell configurations exist and the type of chemistry and configuration that is selected is largely dependent on the requirements of the battery pack. When fuse 113 is tripped, the battery pack 106 becomes disconnected from the DC power bus 107.

The accessory device 102 is modeled with a resistor $R_{LOAD}$ and a capacitance $C_{LOAD}$. The accessory device 102 has a desirable accessory device operating voltage that is required to operate the accessory device 102. Exceeding some margin above or below the desired accessory operating voltage will cause the accessory device 102 to cease operating.

Figure 3:
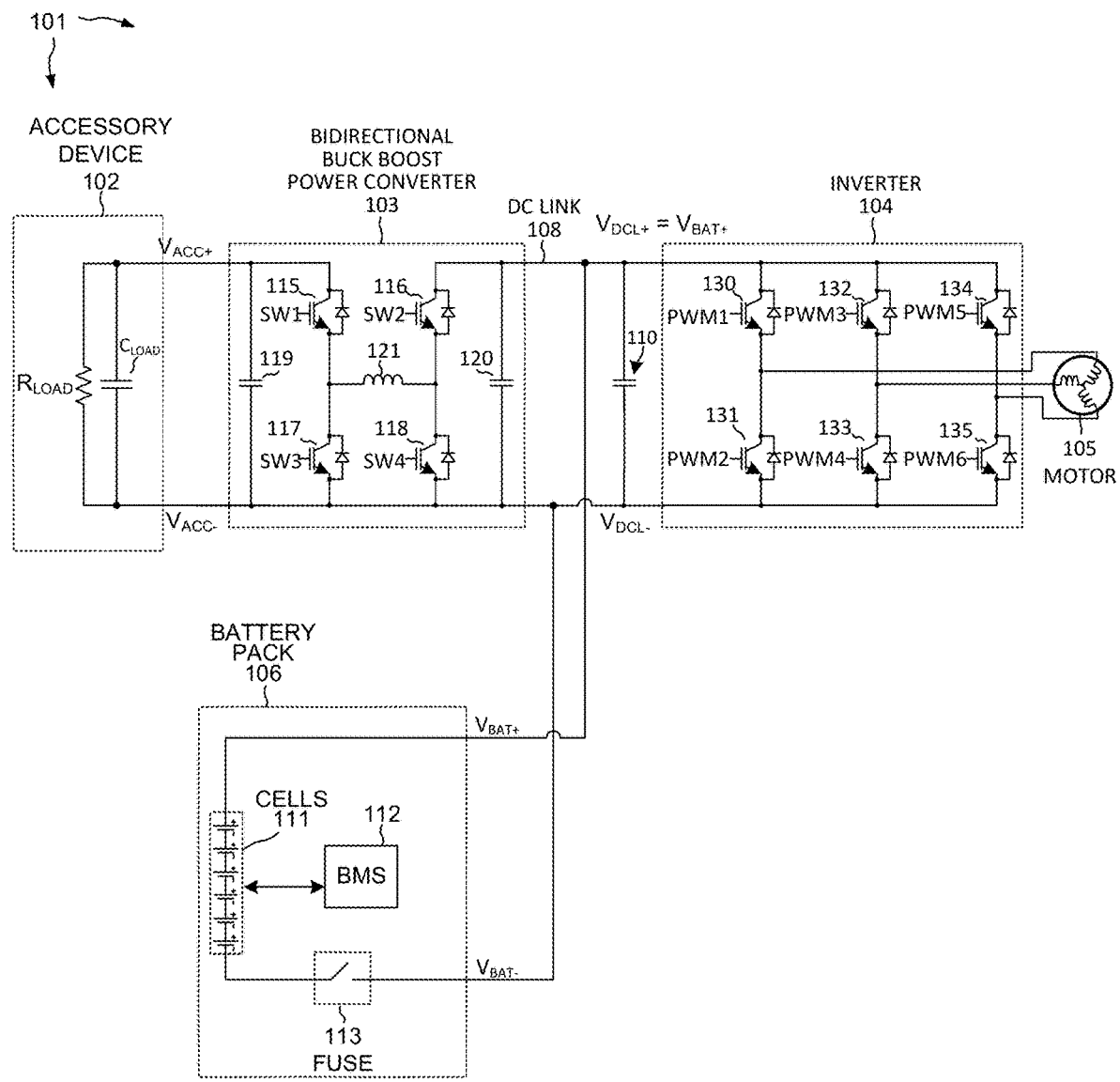
FIG. 3 is a detailed circuit diagram of system 101.

FIG. 3 is a detailed circuit diagram of system 101. In this example, the power converter 103 is a bi-directional buck-boost power converter. The bi-directional buck-boost power converter 103 comprises N-channel Metal Oxide Semiconductor Field-Effect Transistors (MOSFETs) and diode pairs 115, 116, 117, and 118, capacitors 119 and 120, and inductor 121. The transistors need not be MOSFET devices and may be realized as Insulated-Gate Bipolar Transistors (IGBTs). The bi-directional buck-boost power converter 103 is controlled by digital logic control signals SW1, SW2, SW3 and SW4 supplied to converter 103 via a digital control bus (not shown). Digital logic control signal SW1 is supplied to a gate of transistor 115. Digital logic control signal SW2 is supplied to a gate of transistor 116. Digital logic control signal SW3 is supplied to a gate of transistor 117. Digital logic control signal SW4 is supplied to a gate of transistor 118.

Figure 4:
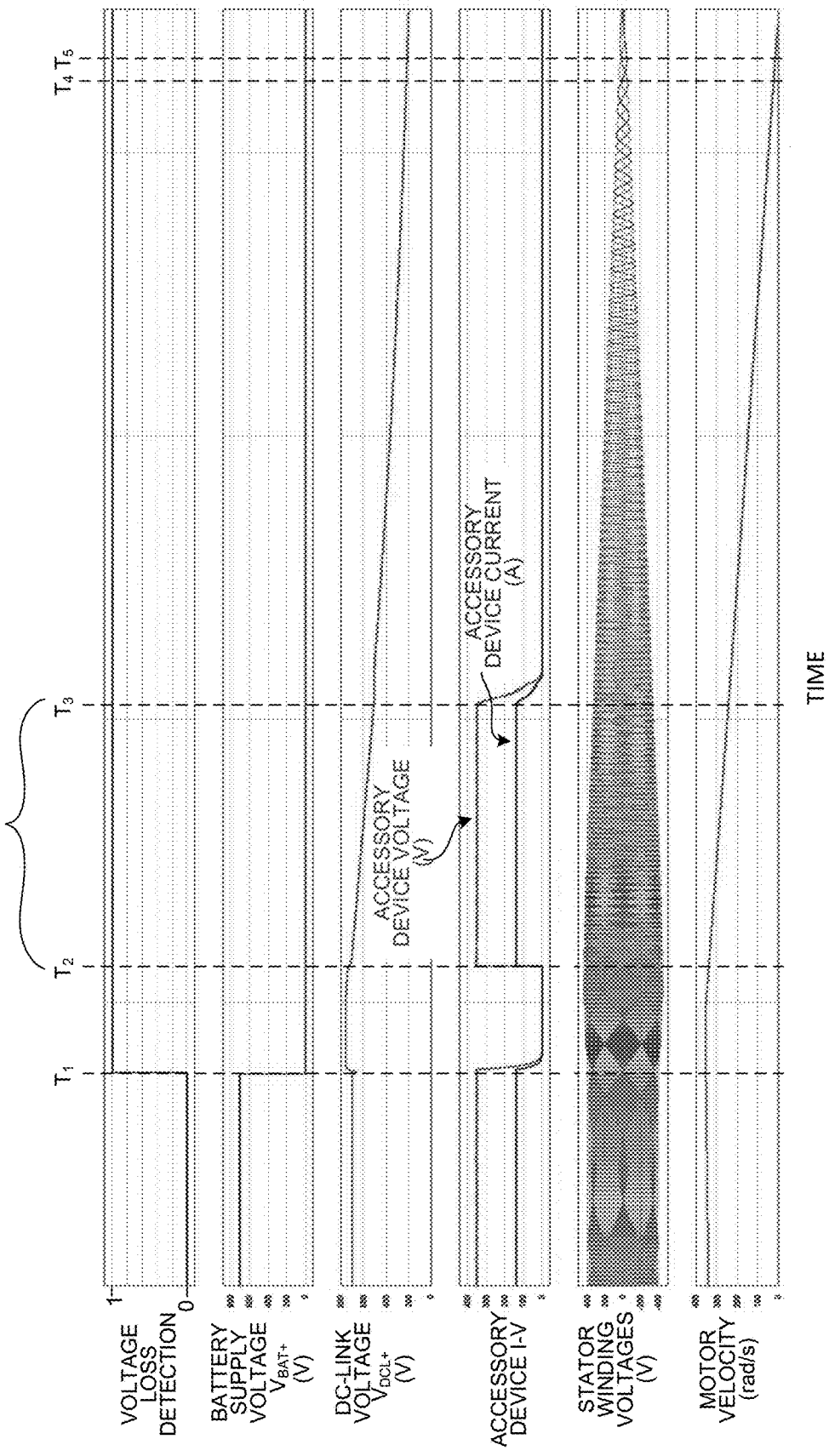
FIG. 4 is a diagram of waveforms along various nodes of the system 101 during conventional operation.
Figure 5:
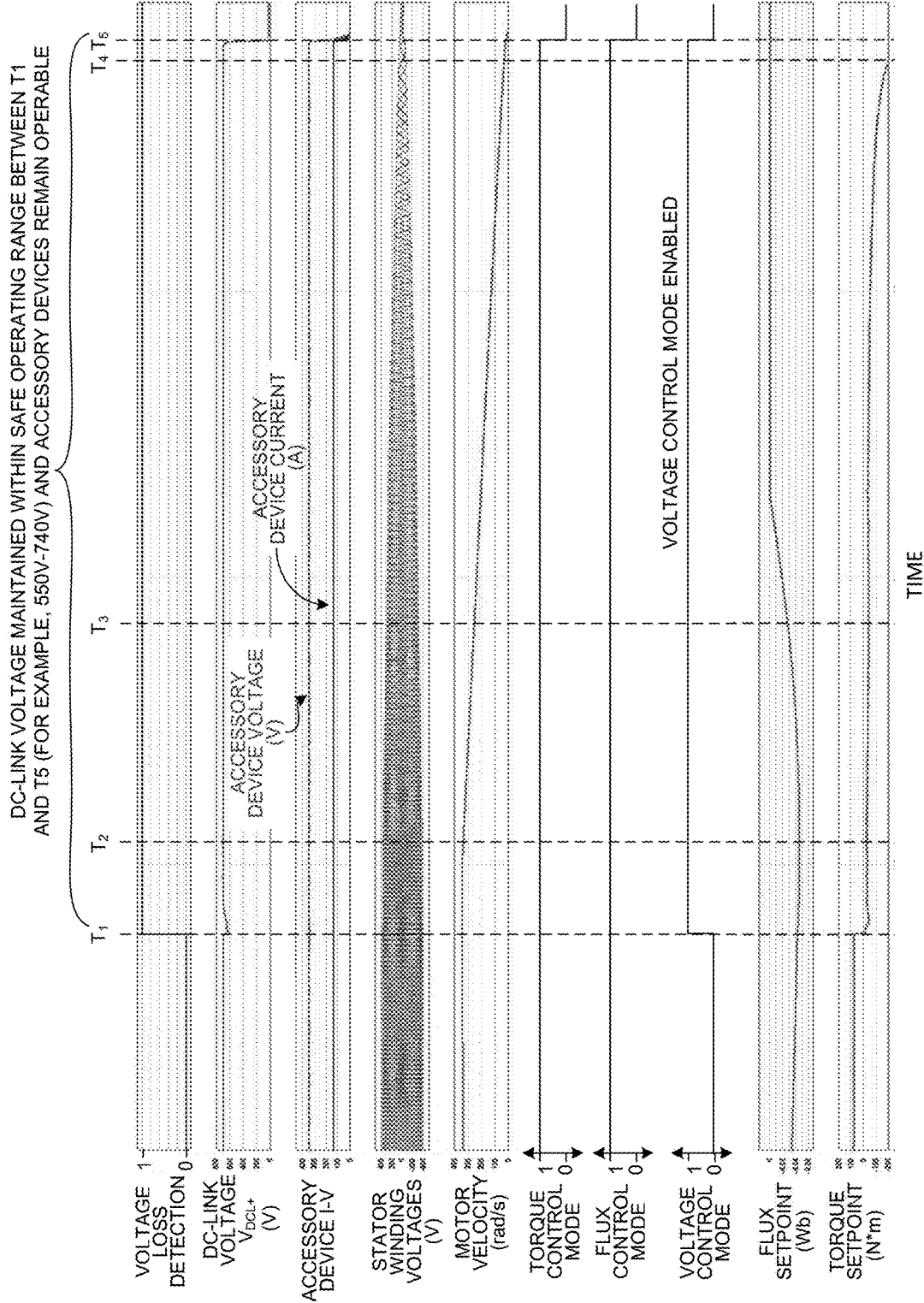
FIG. 5 is a diagram of waveforms along various nodes of the system 101 during novel operation.

The inverter 104 is a three phase inverter that receives a DC voltage from the DC power bus 107 and generates AC stator winding voltages used to drive the electric motor 105. The inverter 104 comprises transistor and diode pairs 130, 131, 132, 133, 134, and 135. In this example, the inverter receives PWM switch control signals PWM1, PWM2, PWM3, PWM4, PWM5, and PWM6. The stator winding voltages are one hundred and twenty degrees (120°) out of phase with respect to each other as shown in FIGS. 4-5. The PWM signals PWM1-PWM6 approximate sine waves in digital form. The electric motor 105 is driven by supplying sinusoidal waveforms across the stator windings of the electric motor 105. The PWM signals PWM1-PWM6 are supplied onto gates of the switching transistors 130-135 which in turn causes the sinusoidal voltages to be supplied to the stator windings. The sinusoidal voltages supplied to windings are shown in the stator winding voltages waveform diagram of FIGS. 4-5. The PWM switch control signals PWM1 and PWM2 are complementary signals. The PWM switch control signals PWM3 and PWM4 are complementary signals. The PWM switch control signals PWM5 and PWM6 are complementary signals.

In operation, the battery pack 106 is discharged and supplies the DC power bus 107. The digital logic levels of the digital control signals SW1-SW4 are controlled such that the accessory device 102 is powered from the DC LINK + 108. The control signals PWM1-PWM6 are controlled such that the electric motor 105 is driven in a desired fashion. If during operation, the fuse 113 trips and the battery pack 106 becomes disconnected, then the accessory device 102 risks no longer being operable.

FIG. 4 is a diagram of waveforms along various nodes of the system 101 during conventional operation. Between time T0 and T1, the system 101 is operating in a normal operating mode. The electric vehicle is traveling at a substantially constant speed. Field weakening control is employed to maintain the electric motor stator winding voltages to be between safe limits $V_{EMF+}$ and $V_{EMF-}$.

At time T1, a total voltage loss event occurs. For example, a total voltage loss event occurs if a fuse is blown. Starting at time T1, the DC link voltage $V_{DCL+}$ begins to increase above a maximum DC link voltage level. The accessory voltage $V_{ACC}$ begins to fall at time T1 until the accessory device 102 is disabled. Between time T1 and T2, the accessory device 102 is susceptible to failure or degradation due to overvoltage conditions on the DC-Link. At time T1, flux control is disabled and torque control is disabled.

At time T2, the DC link voltage $V_{DCL+}$ enters a DC-link voltage safe operating range. Once the DC link voltage $V_{DCL+}$ is below the maximum DC link voltage level, the accessory device 102 is enabled and the accessory voltage $V_{ACC}$ rises to the device's operating voltage level. The example of FIG. 4 assumes that the accessory device 102 is not damaged by overvoltage conditions between time T1 and T2.

At time T3, the DC link voltage $V_{DCL+}$ falls below the minimum DC link voltage level. The accessory device 102 is disabled at time T3 and the accessory voltage $V_{ACC}$ begins to decrease until the accessory voltage $V_{ACC}$ reaches zero volts. The motor velocity continues to decrease until the motor velocity reaches zero at time T5.

FIG. 5 is a diagram of waveforms along various nodes of the system 101 during novel operation. By employing a novel control technique, the DC link voltage $V_{DCL+}$ is controlled to remain in the DC-link voltage safe operating range. Between time T1 and T5, the DC link voltage $V_{DCL+}$ remains between the maximum DC link voltage level and the minimum DC link voltage level, the accessory voltage $V_{ACC}$ remains substantially constant (+/− %0.1 variation), and the accessory device 102 remains enabled. The accessory device 102 continues to operate normally until time T5 when the motor velocity reaches zero causing the DC link voltage $V_{DCL+}$ to approach zero volts.

Figure 6:
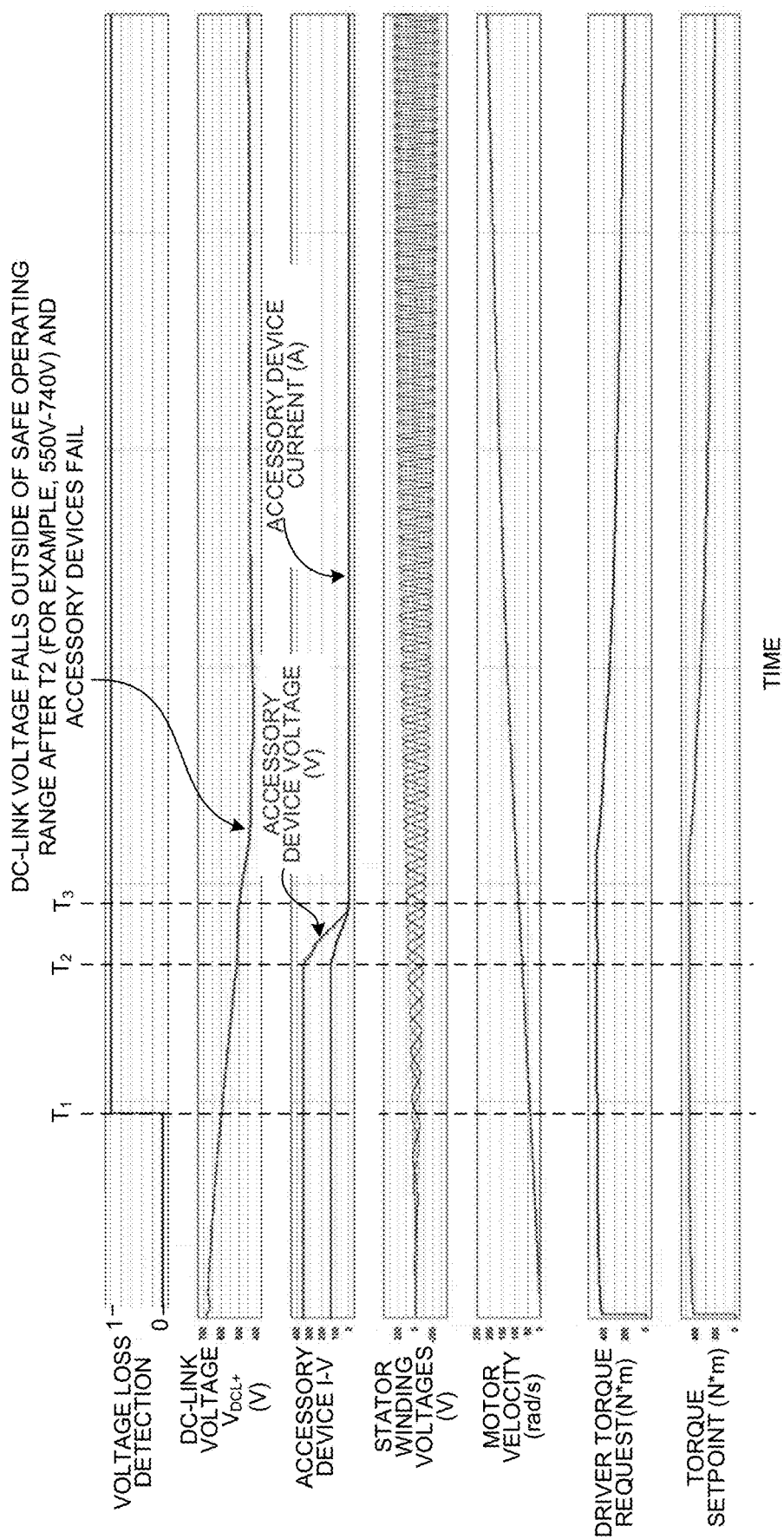
FIG. 6 is a diagram of waveforms for conventional under voltage operation.

FIG. 6 is a diagram of waveforms for conventional under voltage operation. Between time T0 and T1, the system 101 is operating in a normal operating mode. The electric vehicle is traveling at a substantially constant speed. Field weakening control is not employed because the vehicle is at sufficiently low speed that it is not required in order to maintain the electric motor stator winding voltages to be between safe limits $V_{EMF+}$ and $V_{EMF-}$. At time T1, a voltage loss detection event is detected. The DC link voltage $V_{DCL+}$ begins to decrease at time T1. Once the DC link voltage $V_{DCL+}$ falls below the minimum DC-link voltage level at time T2, the accessory device 102 is disabled and the accessory voltage $V_{ACC}$ decreases to zero.

Figure 7:
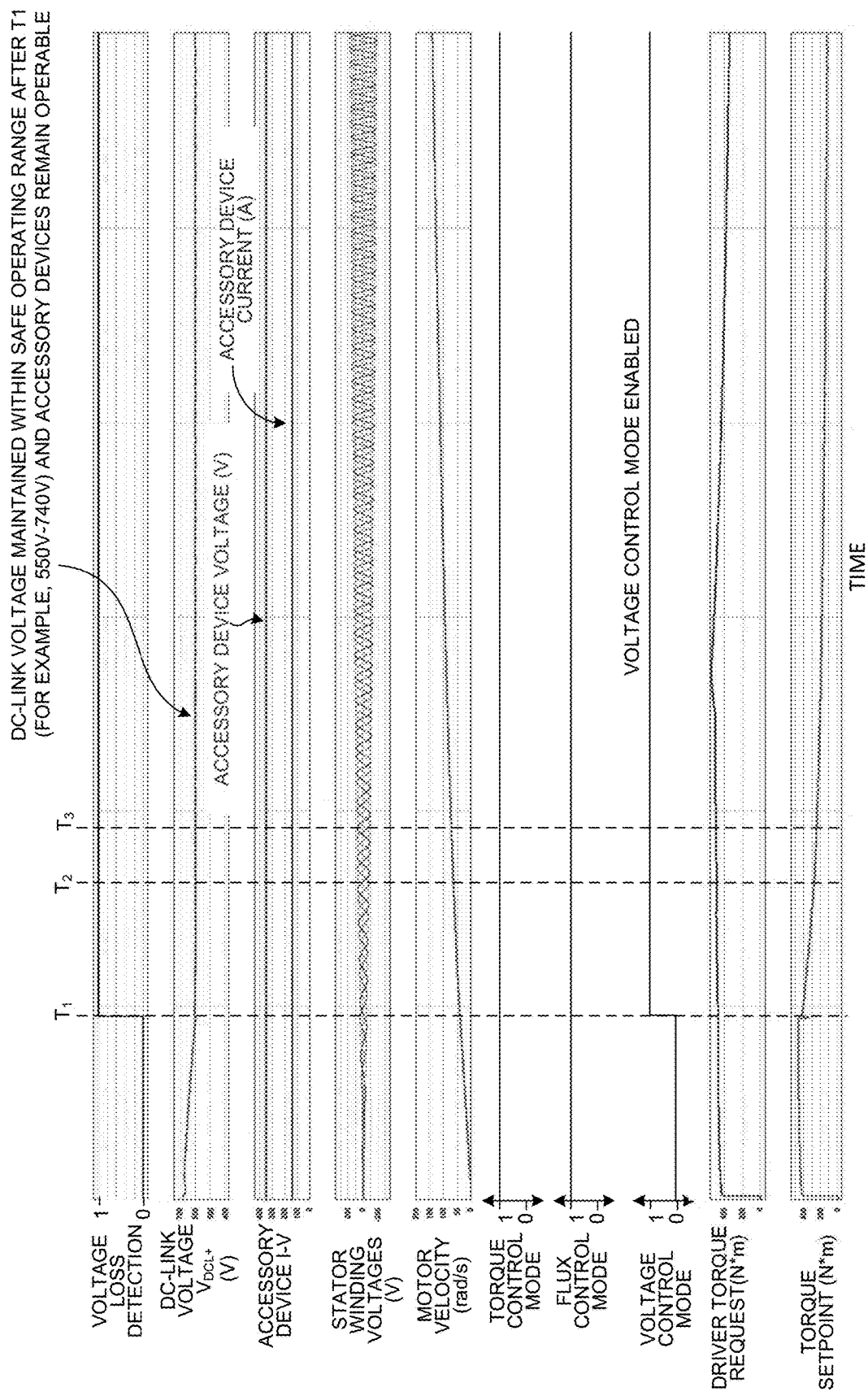
FIG. 7 is a diagram of waveforms for novel under voltage operation.

FIG. 7 is a diagram of waveforms for novel under voltage operation. By employing the novel control technique, the DC link voltage $V_{DCL+}$ is controlled to remain in the DC-link voltage safe operating range after T1 until the motor is disabled.

Figure 8:
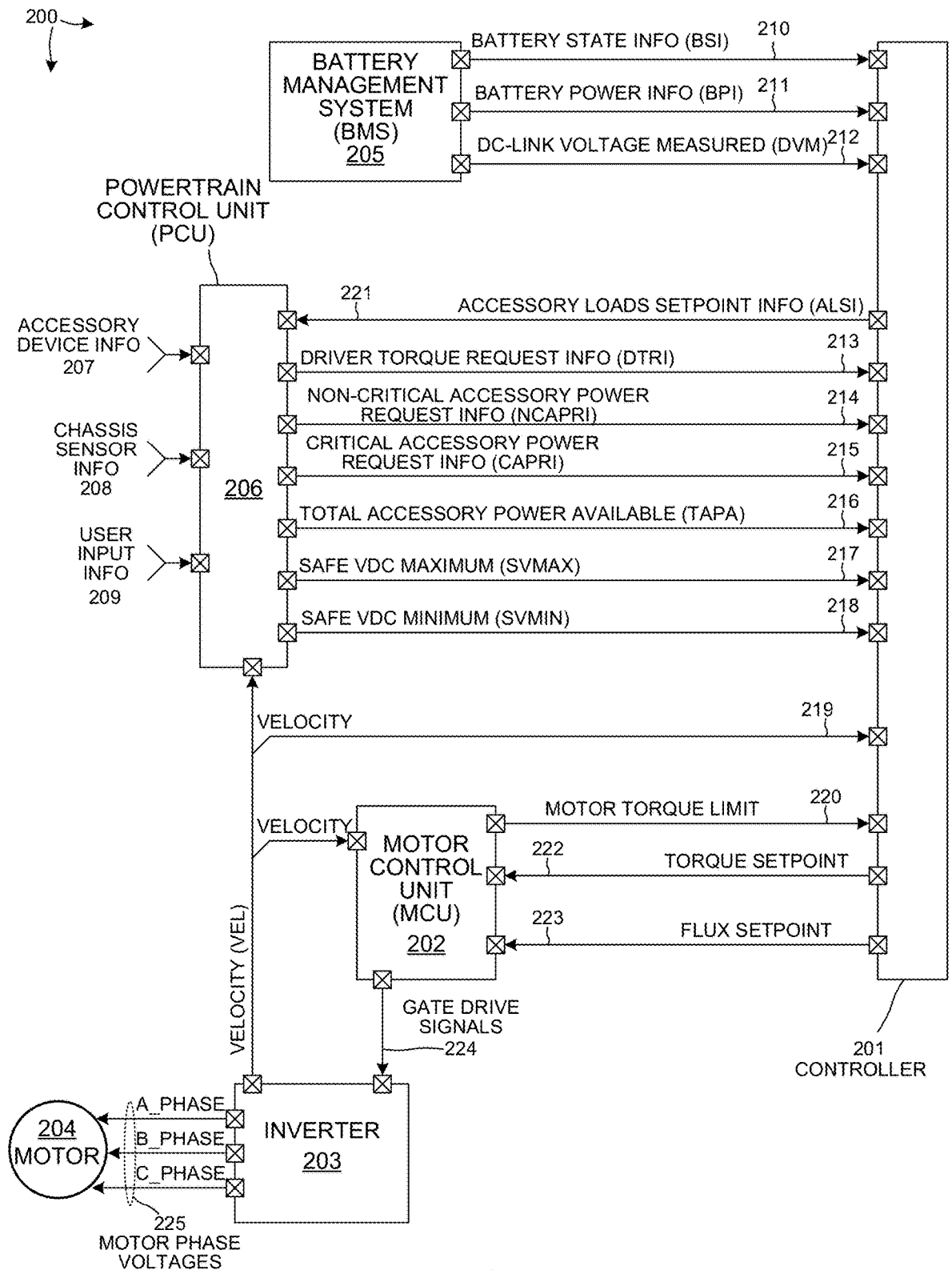
FIG. 8 is a hardware diagram of an exemplary system 200 for use in a vehicle.

FIG. 8 is a hardware diagram of an exemplary system 200 for use in a vehicle, such as the vehicle 100 shown in FIG. 1. System 200 includes a controller 201, a motor control unit (MCU) 202, an inverter 203, a motor 204, a battery management system 205, a powertrain control unit (PCU) 206, accessory inputs 207, chassis sensor inputs 208, and user inputs 209. MCU 202 provides direct current control functionality and quadrature current control functionality to the motor 204. The controller 201 receives a variety of inputs from the PCU 206, BMS 205, inverter 203, and MCU 202. For example, the controller 201 receives a battery state information (BSI) signal 210, a battery power information (BPI) signal 211, and a DC-Link voltage measured (DVM) signal 212 from the BMS 205. The controller 201 also receives a driver torque request information (DTRI) signal 213, a non-critical accessory power request information (NCAPRI) signal 214, a critical accessory power request information (CAPRI) signal 215, a total accessory power available (TAPA) signal 216, a safe VDC maximum (SVMAX) signal 217, and a safe VDC minimum (SVMIN) signal 218 from the PCU 206. The controller 201 also receives a velocity signal 219 from the invertor 203 and a motor torque limit signal 220 from the MCU 202.

The controller 201 also generates a variety of outputs, such as a torque set-point output 222 and a flux set-point output 223 to the MCU 202, and an accessory loads set-point output 221 to the PCU 206. The PCU 206 and MCU 202 also receive the velocity signal 219 from the inverter 203. The inverter 203 receives gate drive signals 224 from the MCU 202. The inverter 203 outputs motor phase voltage signals 225 to the motor 204. The PCU 206 also receives an accessory device information signal 207, a chassis sensor information signal 208, and a user input information signal 209.

Figure 9:
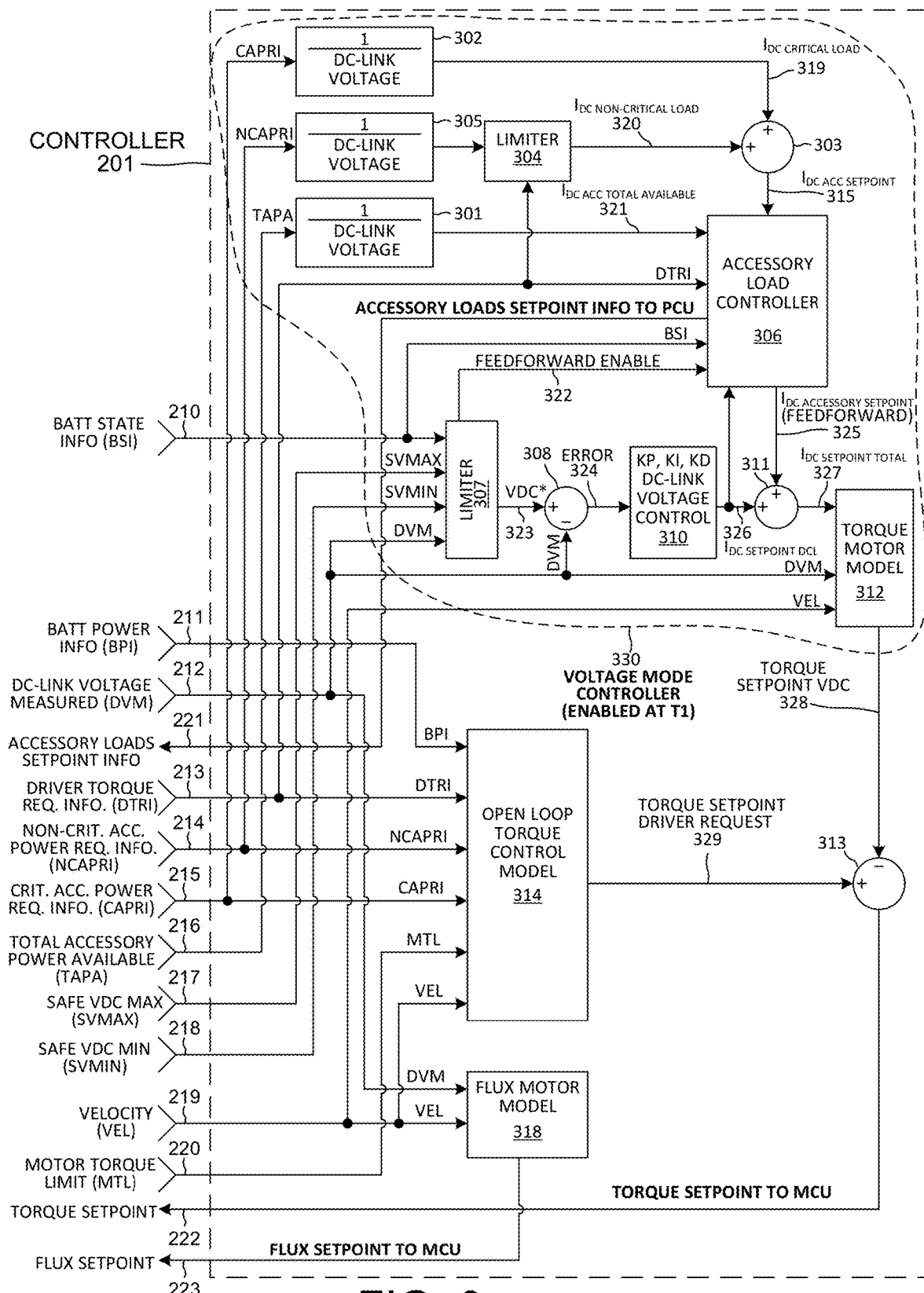
FIG. 9 is a block diagram of controller 201 shown in FIG. 8.

FIG. 9 is a block diagram of the controller 201 shown in FIG. 8. In an exemplary embodiment, the controller 201 comprises power to current converters 301, 302, and 305, current limiter 304, current combiner 303, accessory load controller 306, limiter 307, voltage combiner 308, voltage controller 310, current combiner 311, torque motor model 312, torque setpoint combiner 313, open loop torque control model 314, and flux motor model 318. Selected components of the controller 201 form a voltage mode controller 330.

In an exemplary embodiment, the controller 201 generates target motor torque, target accessory power information, and target motor flux information in accordance with a plurality of prioritized control objectives. A first of the prioritized control objectives is to maintain a DC-link voltage within a safe DC-link operating range. A second of the prioritized control objectives is to maintain a minimum required safety critical accessory power. A third of the prioritized control objectives is to maintain motor torque in accordance with desired output torque information.

In an exemplary embodiment, the limiter 307 performs the following functions.
1. Sets VDC* 323 based on the following logic in order to keep DCL voltage within safe limits.
    If DVM>SVMAX
    VDC*=SVMAX
    else if DVM<SVMIN
    VDC*=SVMIN
    else
    VDC*=DVM
2. Sets FEEDFORWARD ENABLE=TRUE when Voltage Mode Controller is enabled at T1.

Voltage combiner 308 calculates the ERROR 324 between DVM 212 and DC link setpoint VDC* 323.

Voltage controller 310 is a tuned PID voltage controller, which outputs a current setpoint IDC SETPOINT DCL 326 in order to minimize an ERROR 324.

In an exemplary embodiment, limiter 304 limits the accessory non-critical load as necessary to prioritize the driver torque request (DTRI) 213.

The accessory load controller 306 performs the following functions.
1. Based on IDC SETPOINT DCL 326:
   a. If the IDC SETPOINT DCL 326 is less than zero, the controller 306 adjusts the ACCESSORY LOADS SETPOINT INFO TO THE PCU 221 to drive down the DCL voltage, commanding a total accessory load less than or equal to IDC ACC TOTAL AVAILABLE 321.
   b. If the IDC SETPOINT DCL 326 is equal to or greater than zero, the controller 306 disables non-critical accessory loads.
2. The controller 306 calculates the IDC ACCESSORY SETPOINT 325 based on the requirements of enabled loads.
3. The controller 306 executes logic to reduce non-critical accessory loads commanded through ACCESSORY LOADS SETPOINT INFO TO PCU 221 as power is required to achieve DTRI 213 at a lower priority than in step 1a above.

Current combiner 311 adds IDC ACCESSORY SETPOINT 325 to IDC SETPOINT DCL 326 to generate IDC SETPOINT TOTAL 327.

Torque motor model 312 converts the IDC SETPOINT TOTAL 327 to a Torque level that would result in the motor/inverter drawing a current equal to IDC SETPOINT TOTAL 327, based on a model of the motor efficiency, DVM 212 and VEL 219.

Open loop torque control model 314 adjusts DTRI 213 such that the total power does not exceed BPI 211 at velocity VEL 219, critical accessory loads are prioritized based on CAPRI 215, and motor torque limit MTL 220 is not exceeded.

Torque setpoint combiner 313 subtracts TORQUE SETPOINT VDC 328 from TORQUE SETPOINT DRIVER REQUEST 329 to generate a TORQUE SETPOINT 222 to meet control objectives.

Flux motor model 318 generates a flux setpoint 223 to maintain the electric motor stator winding voltages within a safe range to prevent DC-Link overvoltage, based on a model of the motor.

Figure 10:
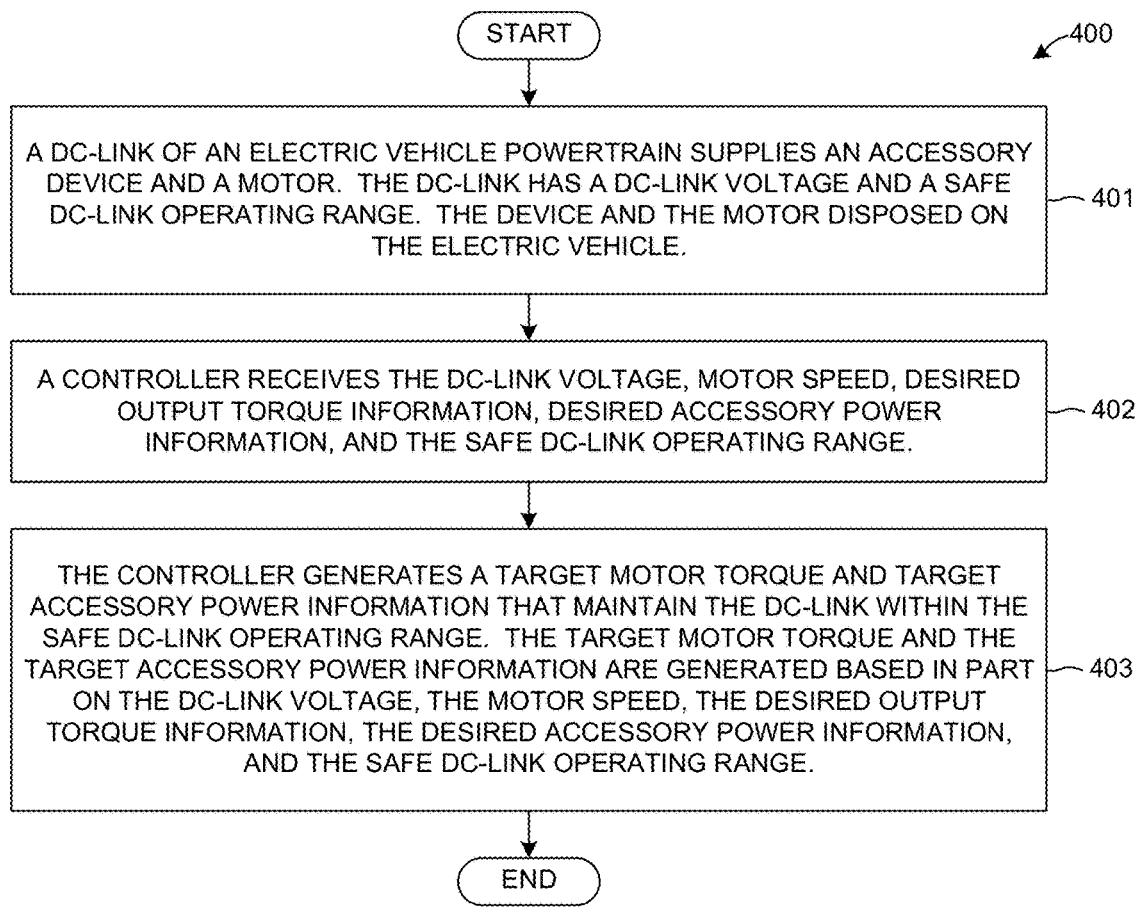
FIG. 10 is a flowchart of a method 400 in accordance with one novel aspect.

FIG. 10 is a flowchart of a method 400 in accordance with one novel aspect. In a first step (step 401), a DC-link of an electric vehicle powertrain supplies an accessory device and a motor. The DC-link has a DC-link voltage and a safe DC-link operating range. The device and the motor disposed on the electric vehicle.

In a second step (step 402), a controller receives the DC-link voltage, motor speed, desired output torque information, desired accessory power information, and the safe DC-link operating range.

In a third step (step 403), the controller generates a target motor torque and target accessory power information that maintain the DC-link within the safe DC-link operating range. The target motor torque and the target accessory power information are generated based in part on the DC-link voltage, the motor speed, the desired output torque information, the desired accessory power information, and the safe DC-link operating range.

Figure 11:
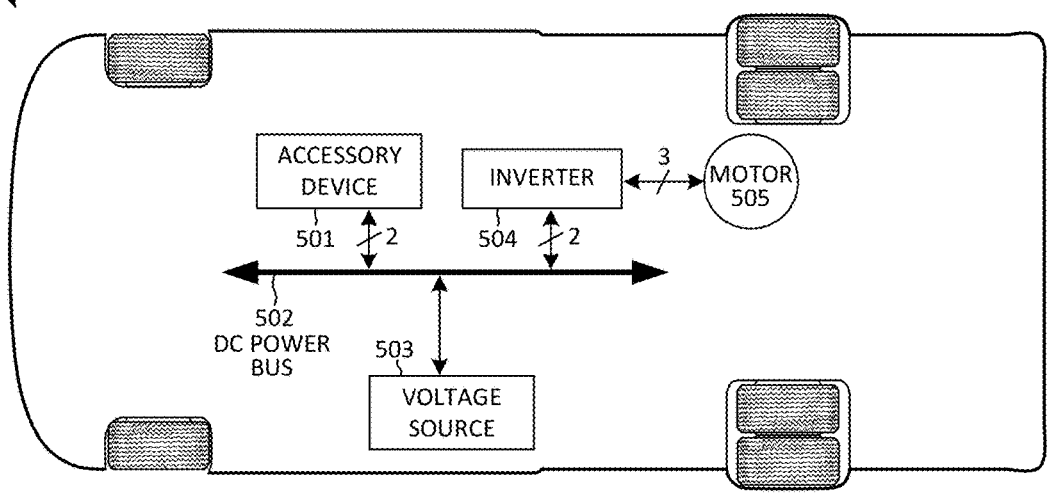
FIG. 11 is a diagram of another embodiment of a system 500 having an accessory device 501 directly coupled to the DC power bus 502.

FIG. 11 is a diagram of another embodiment of a system 500 having an accessory device 501 directly coupled to the DC power bus 502. System 500 is substantially the same as system 101 except, there is no power converter between the accessory device 501 and the DC power bus 502. During operation, if the battery pack 503 becomes disconnected from the DC power bus 502, then the inverter 504 is controlled to maintain a voltage on the DC power bus above a desirable device operating voltage by using a back EMF generated by the electric motor 105.

Although the present invention has been described in connection with certain specific embodiments for instructional purposes, the present invention is not limited thereto. In the example of FIG. 8, the safe DC-link operating range is received onto the controller 201 through SVMAX 217 and SVMIN 218. In another example, the safe DC-link operating range is stored internally in the microcontroller 201. In such an embodiment, the SVMAX and SVMIN values are hard-coded in memory internal to the controller 201, such as flash memory. Accordingly, various modifications, adaptations, and combinations of various features of the described embodiments can be practiced without departing from the scope of the invention as set forth in the claims.

What is claimed is:

1. A system comprising:
    a DC-link;
    an accessory device, wherein the accessory device is supplied by the DC-link;
    a first voltage source connected to the DC-link;
    a motor operable as a current source or a second voltage source; and
    a controller, wherein the controller obtains a DC-link voltage, motor speed, desired output torque information, desired accessory power information, and a safe DC-link voltage operating range, wherein the controller controls the motor to operate as the current source when power is flowing between the first voltage source and the DC-link, wherein the controller controls the motor to operate as the second voltage source when power is not flowing between the first voltage source and the DC-link, and wherein target motor torque and target accessory power information are generated based in part on the DC-link voltage, the motor speed, the desired output torque information, the desired accessory power information, and the safe DC-link voltage operating range, and wherein the target motor torque and target accessory power information maintain the DC-link within the safe DC-link voltage operating range.

2. The system of claim 1, wherein direct current supplied to the motor is generated from quadrature current that is proportional to motor torque, wherein the desired accessory power information includes a minimum required safety critical accessory power, a requested non-safety critical accessory power, and a total available accessory power, and wherein the controller obtains the safe DC-link voltage operating range by receiving information onto the controller or by reading information stored internally on the controller.

3. The system of claim 2, wherein the total available accessory power includes available battery power.

4. The system of claim 2, wherein the controller generates the target motor torque and the target accessory power information in accordance with a plurality of prioritized control objectives, wherein a first of the prioritized control objectives is to maintain the DC-link voltage within the safe DC-link voltage operating range, wherein a second of the prioritized control objectives is to maintain the minimum required safety critical accessory power, and wherein a third of the prioritized control objectives is to maintain motor torque in accordance with the desired output torque information.

5. The system of claim 4, wherein the first of the prioritized control objectives has a higher priority than the second of the prioritized control objectives, and wherein the second of the prioritized control objectives has a higher priority than the third of the prioritized control objectives.

6. The system of claim 1, wherein the target accessory power information includes target power for the accessory device.

7. The system of claim 1, wherein the controller also generates a target direct axis current thereby maintaining the DC-link within the safe DC-link voltage operating range, and wherein the target direct axis current is generated based in part on the DC-link voltage, the motor speed, the desired output torque information, the desired accessory power information, and the safe DC-link voltage operating range.

8. The system of claim 1, wherein the desired output torque information is determined by detecting an accelerator position.

9. The system of claim 1, wherein a motor inverter is coupled between the motor and the DC-link.

10. A method comprising:
    supplying an accessory device with a DC-link, wherein the DC-link has a DC-link voltage and a safe DC-link voltage operating range, and wherein the accessory device and a motor are disposed within an electric vehicle;
    receiving the DC-link voltage, motor speed, desired output torque information, desired accessory power information, and the safe DC-link voltage operating range onto a controller; and
    controlling the motor to operate as a voltage source when a fuse connected to an input voltage source is tripped and total input voltage loss occurs, wherein target motor torque and target accessory power information are generated based in part on the DC-link voltage, the motor speed, the desired output torque information, the desired accessory power information, and the safe DC-link voltage operating range, and wherein the target motor torque and target accessory power information maintain the DC-link within the safe DC-link voltage operating range.

11. The method of claim 10, wherein the desired accessory power information includes a minimum required safety critical accessory power, a requested non-safety critical accessory power, and a total available accessory power.

12. The method of claim 11, wherein the total available accessory power includes available battery power.

13. The method of claim 11, wherein the controlling of the motor is performed by the controller such that the target motor torque and the target accessory power information are generated in accordance with a plurality of prioritized control objectives, wherein a first of the prioritized control objectives is to maintain the DC-link voltage within the safe DC-link voltage operating range, wherein a second of the prioritized control objectives is to maintain the minimum required safety critical accessory power, and wherein a third of the prioritized control objectives is to maintain motor torque in accordance with the desired output torque information.

14. The method of claim 13, wherein the first of the prioritized control objectives has a higher priority than the second of the prioritized control objectives, and wherein the second of the prioritized control objectives has a higher priority than the third of the prioritized control objectives.

15. The method of claim 10, wherein the target accessory power information includes target power for the accessory device.

16. The method of claim 10, wherein the desired output torque information is determined by detecting an accelerator position.

17. The method of claim 10, wherein the supplying of the accessory device involves a motor inverter coupled between the motor and the DC-link.

18. A method comprising:
supplying an accessory device with a DC-link, wherein the DC-link has a DC-link voltage and a safe DC-link voltage operating range, and wherein the accessory device and a motor are disposed within an electric vehicle;
receiving the DC-link voltage, motor speed, desired output torque information, desired accessory power information, and the safe DC-link voltage operating range onto a controller;
controlling the motor to operate as a voltage source when a fuse connected to an input voltage source is tripped and total input voltage loss occurs, wherein target motor torque and target accessory power information are generated based in part on the DC-link voltage, the motor speed, the desired output torque information, the desired accessory power information, and the safe DC-link voltage operating range, and wherein the target motor torque and target accessory power information maintain the DC-link within the safe DC-link voltage operating range; and
generating a target direct axis current, wherein the target direct axis current maintains the DC-link within the safe DC-link voltage operating range, and wherein the target direct axis current is generated based in part on the DC-link voltage, the motor speed, the desired output torque information, the desired accessory power information, and the safe DC-link voltage operating range.

19. A system comprising:
a DC-link that is coupled to supply an accessory device and a motor, wherein the DC-link, the motor, and the accessory device are disposed within an electric vehicle; and
means for controlling the motor to operate as a voltage source when a fuse connected to an input voltage source is tripped and total input voltage loss occurs, wherein target motor torque and target accessory power information are generated based in part on a DC-link voltage, a motor speed, a desired output torque information, a desired accessory power information, and the safe DC-link voltage operating range, and wherein the target motor torque and target accessory power information maintain the DC-link within the safe DC-link voltage operating range.

20. The system of claim 19, wherein the means is a controller.

* * * * *